July 31, 1962 F. G. F. BEHLES 3,047,284
SHOCK-ABSORBING SPRING STRUT, PARTICULARLY FOR MOTOR VEHICLES
Filed Oct. 28, 1958
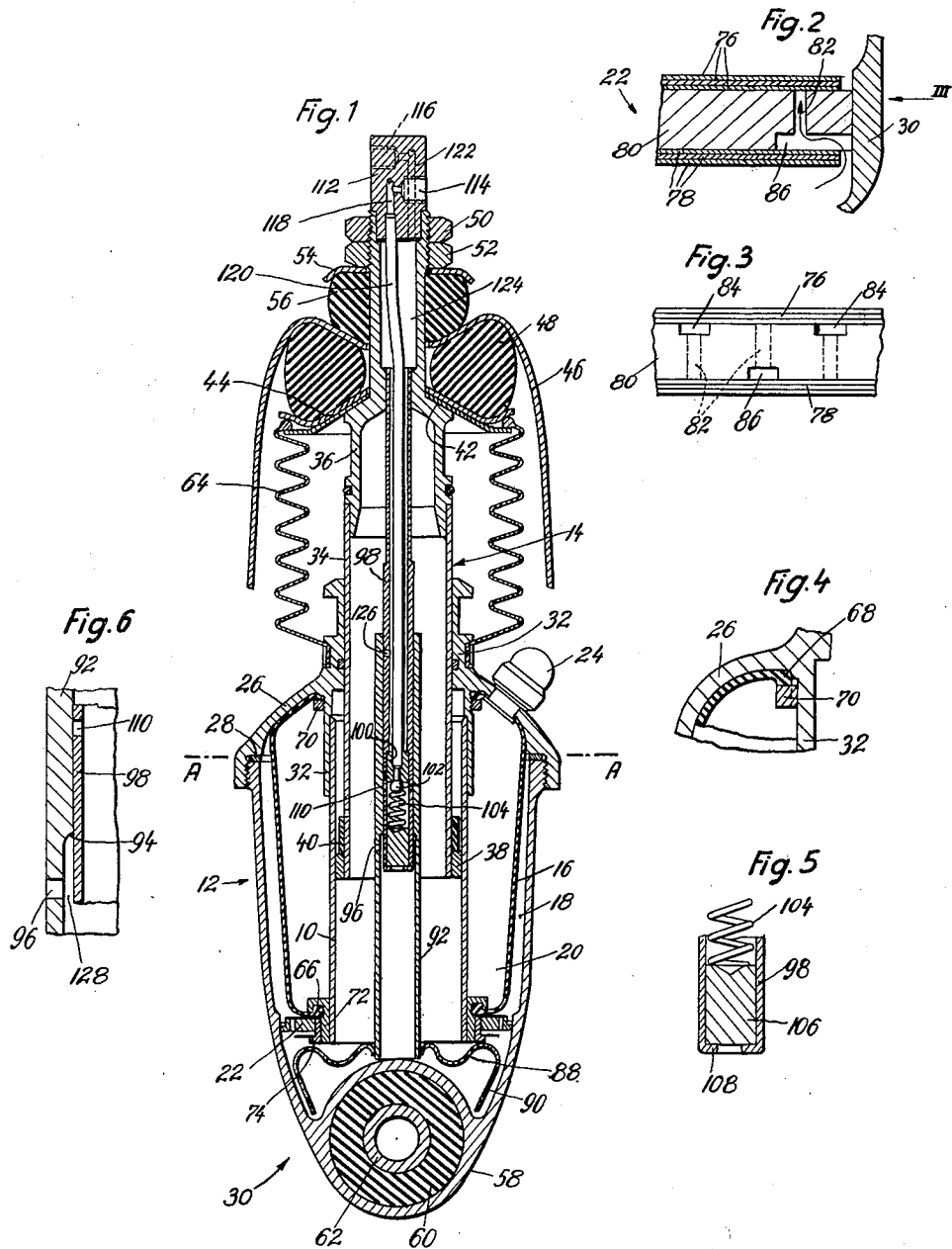
Inventor
FRANZ G. F. BEHLES
BY Dicke and Craig
ATTORNEYS

United States Patent Office 3,047,284
Patented July 31, 1962

3,047,284
SHOCK-ABSORBING SPRING STRUT, PARTICU-
LARLY FOR MOTOR VEHICLES
Franz G. F. Behles, Stuttgart-Schonberg, Germany, assignor to Daimler-Benz Aktiengesellschaft, Stuttgart-Unterturkheim, Germany
Filed Oct. 28, 1958, Ser. No. 770,185
Claims priority, application Germany Nov. 7, 1957
10 Claims. (Cl. 267—64)

My invention relates to a shock-absorbing spring strut of the type in which a housing surrounds an operating cylinder of the strut in co-axial relationship and includes co-axial chambers separated by a flexible partition, one chamber having a filling of a compressed gaseous medium and the other chamber having a filling consisting of a liquid, such as oil, and being in communication with the operating cylinder.

It is the primary object of my invention to provide an improved shock-absorbing spring strut of this character in which the liquid filling is effectively cooled and, for this purpose, is subjected to the cooling effect of the wind produced by the travel of the motor vehicle. Moreover, it is an object of my invention to minimize the loss of the compressed gaseous medium by diffusion through the walls of the housing or through joints provided between sections thereof. Finally, it is an object of my invention to provide an improved shock-absorbing spring strut of the type indicated which is simple and reliable in operation and can be easily assembled and disassembled.

Further objects of my invention will appear from the detailed description of a preferred embodiment thereof following hereinafter with reference to the accompanying drawings. I wish it to be clearly understood, however, that my invention is in no way limited to the details of such embodiment but is capable of numerous modifications within the scope of the appended claims and that the phrases and terms used in such detailed description have been chosen for the purpose of explaining the invention rather than that of restricting or limiting the same.

In the drawing:
FIG. 1 is an axial section taken through my improved shock-absorbing spring strut,
FIG. 2 represents a portion of FIG. 1 drawn on an enlarged scale,
FIG. 3 is a partial side view of the valve element shown in FIG. 2 viewed in the direction of the arrow III, and
FIGS. 4, 5 and 6 are various portions of FIG. 1 drawn on an enlarged scale.

The shock-absorbing spring strut shown in the drawing comprises an upright cylinder 10, a housing 12 co-axially surrounding the cylinder 10 and fixed to the upper end thereof and a plunger 14 which is slidable in the cylinder 10 and extends out of the upper end thereof and out of the housing 12, the lower end of the housing constituting one end of the strut and the upper end of the plunger 14 constituting the other end of the strut.

A flexible partition 16 consisting of an oil-resistant rubber or rubber-like plastic divides the internal space of the housing 12 into an outer chamber 18 and an inner chamber 20. The outer chamber 18 is confined by the wall of the housing 12 and by the partition 16 and communicates with the lower end of the cylinder 10 through a valve member 22, whereas the inner chamber 20 is confined by the cylinder 10 and by the partition 16 and is sealed by suitable means. While the operating cylinder 10 and the outer chamber 18 communicating therewith contain a liquid filling, the inner chamber 20 has a gaseous filling preferably consisting of compressed air admitted through a suitable valve 24.

Preferably, the housing 12 is split in a plane extending through the outer chamber 18 and through the inner chamber 20, such plane being indicated in FIG. 1 by the line A—A. The upper cup-shaped section 26 of the housing 12 has an internal shoulder 28 engaging the upper annular end face of the lower section 30 of the housing 12, a suitable gasket being interposed therebetween and both sections having a threaded joint which may comprise internal threads in the marginal portion of housing section 26 engaged by external threads provided on the upper end of the lower housing section 30. The cup-shaped section 26 has a central opening and is integral with a bushing 32 which surrounds the central opening and has an upper section slidably accommodating the plunger 14 and a lower section which surrounds and is suitably fixed, for instance soldered, to the upper end of the cylinder 10 which is preferably formed by a thin tubular steel member.

The plunger 14 is preferably likewise formed by a thin tubular member 34 of a suitable metal and of a second tubular member 36 fixed to the upper end of the member 34. The lower end of the tubular member 34 carries an external piston ring 38 which sealingly and slidably engages the inner surface of the cylinder 10 and is fixed to the tubular member 34 by suitable means including a ring 40.

The upper end of the tubular member 36 has a conical shoulder 42 carrying a washer 44 on which a sheet metal beam 46 of the chassis of a motor vehicle is supported through the intermediary of an annular rubber cushion 48. The reduced upper end of the tubular member 36 extends through the rubber cushion 48 and through an opening provided in the sheet metal beam 46 and is provided with external threads for engagement with nuts 50 and 52 which rest upon a washer 54 which in its turn is supported by an annular cushion 56 resting upon the sheet metal beam 46.

The lower end of the housing section 30 is formed with an eye 58 which may be pivotally connected to an axle of the motor vehicle by means of a rubber sleeve 60 and a hollow pivot pin 62 extending therethrough.

For the purpose of protecting the upper end of the plunger member 34 extending out of the housing 12 from dirt and dust, a bellows 64 surrounding the upper end of the plunger has its upper edge clamped to the washer 44 by suitable means and has its lower end suitably fixed to the housing bushing 32.

The partition 16 comprises a substantially conical main section tapering downwardly and having a circular lower edge of reduced diameter formed with a bead 66, whereas the upper edge of the partition 16 is formed with a circular bead 68. The bead 68 is firmly pressed and thus sealed against the inside of the housing section 26 by a ring 70 having internal threads engaging external threads provided on the bushing 32. Similarly, the lower circular bead 66 of the partition 16 is inserted in a peripheral groove of an annular mounting member 72 which is fixed, for instance soldered, to the outer surface of the lower end of the cylinder 10 and is so shaped that its annular groove opens downwardly and outwardly. The bead 66 is held in this groove by a ring 74 which surrounds the lower end of the mounting member 72 and threadingly engages the same to be firmly pressed against the bead 66.

Suitable valve means are provided for restricting the communication between the outer chamber 18 and the cylinder 10. In the embodiment shown this valve means is formed by a stack of superimposed annular disks comprising an upper group of three resilient disks 76 of thin sheet metal, a lower group of thin disks 78 of thin sheet metal and a disk 80 of greater thickness between the two groups 76 and 78. This stack of disks surrounds the ring 74 and is seated between the upper overhanging portion of the annular mounting member 72 and a peripheral flange provided on the lower end of the ring 74 with a limited axial clearance. The disks 80 engages a cylindrical portion of the internal surface of the housing section 30, whereas the disks 76 and 78 are slightly spaced from such cylindrical surface. The disk 80 is provided with circumferentially distributed spaced vertical bores 82 and with radial grooves 84 and 86 extending from the periphery of the disk 80 to the bores 82. The grooves 84 are provided in the upper face of the disk 80 and alternate with the grooves 86 provided in the lower face of the disk 80.

The upper portion of the partition 16 and the upper housing section 26 are provided with registering holes for extension therethrough of a bushing which carries the inlet valve 24 which normally is closed by a cap and affords a possibility of charging the chamber 20 with compressed air of, for instance, 700 pounds per square inch.

When the spring strut is compressed, the plunger 14 moves in downward direction with respect to the housing 12 displacing part of the liquid filling from the cylinder 10 through the open lower end thereof into the bottom portion of the housing section 30 and the displaced liquid tends to pass through the grooves 86 and the bores 82 of the valve member in the manner indicated by the arrow in FIG. 2. As a result, the liquid must lift the resilient sheet metal disks 76, whereby an efficient shock-absorbing effect will be attained. The liquid entering the chamber 18 will press the flexible partition 16 inwardly, thus increasing the compression of the gaseous filling of chamber 20.

When the spring strut is extended, the compressed air will displace liquid from the chamber 18 causing it to flow through the grooves 84 and the bores 82 into the lower end of the cylinder 10 which extends freely into the housing 12 being spaced from the bottom thereof.

Owing to the disposition of the chamber 18 between the partition 16 and the wall of the housing section 30, the oil filling will be effectively cooled by the wind passing over the housing section 30 and any diffusion of the compressed gaseous medium in the chamber 20 through the walls of the housing 12 and, more particularly, through the gasket 28 is effectively prevented or minimized by the liquid filling. Moreover, it will be appreciated that the disposition of the valve means 22 so as to surround the lower end of the cylinder results in a simple structure and reduces the length of the strut to a minimum.

Preferably, suitable means connected with the plunger 14 and with the cylinder 10 are operable by the relative sliding movement thereof for circulating liquid through the cylinder. A resilient sheet metal member 88 having a central opening and a peripheral conical section 90 is inserted in the housing 12 on the bottom of the section 30 thereof and is held in the position shown with its conical section 90 resting on the conical side wall of the housing section 30 by the ring 74 fixed to the cylinder 10. The lower end of a tube 92 co-axially inserted in the cylinder 10 extends into the central hole of the sheet metal member 90 and is suitably fixed, for instance soldered, thereto. The tube 92 has an upper section of a reduced internal diameter and a lower section of a larger internal diameter, thus forming an internal shoulder indicated in FIG. 6 at 94. Below this shoulder the tube 92 has a plurality of circumferentially distributed ports 96 establishing communication between the internal spaces of the cylinder 10 and of the tube 92. The upper end of the latter terminates within the bushing 32.

The upper end of a hollow plunger 98 co-axially disposed within the plunger 14 extends into an axial bore of the upper section 36 of plunger 14 and is suitably fixed thereto, for instance by soldering. The lower end of the hollow plunger 98 is slidably guided within the tube 92 and terminates near the lower end of plunger 14 and is provided with an axial bore in which a plurality of elements are inserted in superimposed relationship, such elements comprising a tubular valve seat 100, a spherical valve member 102, a helical spring 104 and a plug 106 which is preferably held in position by an internal flange 108 which may be formed on the lower end of plunger 98 by peening. A plurality of circumferentially distributed ports 110 is provided in the hollow plunger 98 below the valve seat member 100. A plug 112 inserted in the upper end of the hollow plunger 14 and projecting therefrom above the nut 50 has an inlet port 114 and an outlet port 116. The inlet port which is connected with a source of liquid by a suitable pipe not shown communicates with a vertical bore 118 in which the upper end of a pipe 120 is sealingly inserted. The lower end of the pipe 120 is inserted in the internal passageway of the valve seat member 100. The outlet port 116 of the plug 112 is put by a longitudinal bore 122 into communication with the interior space 124 provided in the top portion of the section 36 of the plunger 14 and this space 124 is in permanent communication with the interior space of the plunger 98 through which the pipe 120 extends with considerable clearance. The plunger 98 is provided with a plurality of circumferentially distributed ports 126 located a substantial distance above the valve member 100.

For an explanation of the operation let it be assumed that starting from the position shown in FIG. 1 the spring strut is compressed. As a result, the plungers 14 and 98 moving in unison are pushed downwardly into the cylinder 10 and the tube 92, respectively. The liquid displaced from the tube 92 by the descending lower end of the plunger 98 flows through the annular gap 128, FIG. 6, and the ports 96 into the cylinder 10 and, thence, through the valve means 22 into the chamber 18. When the ports 110 descend beneath the shoulder 94, oil under pressure supplied to the inlet port 114 flows through the bore 118, the pipe 120 and the valve seat member 100 past the spherical check valve 102 through the ports 110, the annular gap 128 and the ports 96 into the cylinder. When the spring strut is relieved from pressure and extends owing to the pressure exerted by the liquid on the plunger 14 in the cylinder 10, the ports 110 will move above the shoulder 94, thus interrupting the communication between the inlet port 114 and the chamber 18. Upon further upward movement of the plungers 14 and 98, however, the ports 126 will be uncovered by the upper end of the tube 92 and will establish communication between the chamber 18 and the outlet port 116 via valve member 22, cylinder 10, the annular space between plunger section 34 and the tube 92, ports 126, the hollow plunger 98, space 124 and bore 122. As a result, liquid may be discharged from the spring strut and returned to the same source of pressure which supplies the inlet port 114 with liquid.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Shock-absorbing spring strut comprising an upright cylinder, a housing co-axially surrounding said cylinder and fixed to the upper end thereof and provided with an opening co-axially disposed with respect to said cylinder, a flexible partition in said housing surrounding said cylinder and dividing the internal space of said housing into an outer chamber and an inner chamber and having a circular lower edge, said outer chamber being confined by the wall of said housing and by said partition and communicating with the lower end of said cylinder, a plunger slidable in and extending out of the other end of said cylinder and out of said opening, said inner chamber being confined by said cylinder and by said partition, means for sealingly fixing said edge of said partition to said cylinder near the lower end thereof, a gaseous filling in said inner chamber, a liquid filling in said cylinder and in said outer chamber, means for restricting the communication between said outer chamber and said cylinder, and means connected with said plunger and with said cylinder and operable by the relative sliding movement thereof for circulating liquid through said cylinder, the lower end of said housing constituting one end of said strut and the upper end of said plunger constituting the other end of said strut.

2. A shock-absorbing spring strut, as defined in claim 1, wherein said means for circulating liquid through said cylinder includes a hollow plunger one end of which is arranged within said cylinder and said plunger, means connecting the other end of said hollow plunger with a source of liquid separate from said strut, and means for interconnecting said one end of said hollow plunger with said cylinder.

3. A shock-absorbing spring strut, as defined in claim 2, wherein said means for connecting said one end of said hollow plunger with said cylinder includes a tubular member supported adjacent the lower end of said housing and extending into said cylinder, said hollow plunger being slidable within said tubular member, said hollow plunger and said tubular member constituting a valve means for controlling the flow from said separate source of liquid to said cylinder.

4. A shock-absorbing spring strut comprising a cylinder, a housing surrounding said cylinder and fixed thereto, a flexible partition in said housing dividing its internal space into an outer chamber and an inner chamber, said housing including two sections joined along a plane extending through both said outer chamber and said inner chamber, one of said sections including a bushing extending inwardly of said housing and surrounding one end of said cylinder, said partition being secured within said housing at one end adjacent to said bushing and at the other end to the other end of said cylinder, said outer chamber being defined by the wall of said housing and by said partition and being divided into an upper and a lower portion, said lower portion communicating directly with said other end of said cylinder, and said upper portion communicating with said lower portion, a plunger slidable in and extending out of said one end of said cylinder and out of said housing, said inner chamber being defined by said cylinder and by said partition and containing a gaseous filling, a liquid filling in said cylinder and in said outer chamber, and means for selectively supplying liquid to and exhausting liquid from said cylinder and said outer chamber upon spring movement of said strut.

5. A shock-absorbing spring strut, as defined in claim 4, wherein said upper and lower portions of the outer chamber are defined by a valve means restricting communication between the upper and lower portions of said outer chamber, said valve means being arranged adjacent said other end of the cylinder.

6. A shock-absorbing spring strut, comprising an upright cylinder, a housing coaxially surrounding said cylinder and fixed to the upper end thereof and provided with an opening coaxially disposed with respect to said cylinder, a flexible partition in said housing surrounding said cylinder and dividing the internal space of said housing into an outer chamber and an inner chamber and having a circular lower edge, said housing including two sections joined along a plane extending through both said inner chamber and said outer chamber, said outer chamber being defined by the wall of said housing and by the partition and being divided into an upper and a lower portion, said lower portion communicating directly with one end of said cylinder, and said upper portion communicating with said lower portion, a plunger slidable in and extending out of the other end of said cylinder and out of said opening, said inner chamber being defined by said cylinder and by said partition, means for sealingly fixing said edge of said partition to said cylinder near the lower end thereof, a gaseous filling in said inner chamber, a liquid filling in said cylinder and in said outer chamber, said liquid filling being thereby effectively disposed on both sides of said inner chamber, means for restricting the communication between said upper and said lower portions including valve means, and means connected with said plunger and with said cylinder and operable by the relative sliding movement thereof for selectively supplying liquid to and exhausting liquid from said cylinder and outer chamber, the lower end of said housing constituting one end of said strut and the upper end of said plunger constituting the other end of said strut.

7. In a vehicle having axle means and a chassis, a shock-absorbing spring strut as defined in claim 3, means for securing said plunger to said chassis without said housing, and means for securing said housing to said axle means.

8. A shock-absorbing spring strut comprising a cylinder, a housing surrounding said cylinder and fixed thereto, a flexible partition in said housing dividing its internal space into an outer chamber and an inner chamber, said outer chamber being confined by the wall of said housing and by said partition and being divided into an upper and a lower portion, said lower portion communicating directly with one end of said cylinder, and said upper portion communicating with said lower portion, a plunger slidable in and extending out of the other end of said cylinder and out of said housing, said inner chamber being confined by said cylinder and by said partition, means for sealing said inner chamber, a gaseous filling in said inner chamber, a liquid filling in said cylinder and in said outer chamber, and valve means for restricting the communication between said upper and lower portions of said outer chamber, said valve means including upper disk means, lower disk means, and a central disk, said central disk being of greater diameter than said disk means and being provided with a plurality of circumferential bores and radial grooves extending from said bores to the periphery of the disk, said radial grooves alternating from one side of said disk to the other.

9. A shock-absorbing spring strut comprising a cylinder, a housing surrounding said cylinder and fixed thereto, one end of said cylinder being freely arranged within said housing and the other end of said cylinder being secured to said housing, a flexible partition in said housing dividing its internal space into an outer chamber and an inner chamber, said flexible partition having one end secured to said one end of said cylinder and the other end secured adjacent the other end of said cylinder, said housing being split in a plane extending through said outer chamber and through said inner chamber, said outer chamber being defined by the wall of said housing and by said partition and communicating with said one end of said cylinder, a plunger slidable in and extending out of said other end of said cylinder and out of said housing, said inner chamber being defined by said cylinder and by said partition, means for sealing said inner chamber, a gaseous filling in said inner chamber, and a liquid filling in said cylinder and in said outer chamber, said liquid filling being thereby effectively disposed on both sides of said inner chamber.

10. Shock-absorbing spring strut comprising a cylinder, a housing surrounding said cylinder and fixed thereto, a flexible partition in said housing dividing its internal space into an outer chamber and an inner chamber, said outer chamber being confined by the wall of said housing and by said partition and communicating with one end of said cylinder, valve means mounted between said one end of said cylinder and the wall of said housing for restricting the communication between said outer chamber and said cylinder, a single mounting member for securing both said valve means and said partition to said cylinder, a plunger slidable in and extending out of the other end of said cylinder and out of said housing, said inner chamber being confined by said cylinder and by said partition, means for sealing said inner chamber, a gaseous filling in said inner chamber, and a liquid filling in said cylinder and in said outer chamber, said liquid filling being thereby effectively disposed on both sides of said inner chamber.

References Cited in the file of this patent

UNITED STATES PATENTS

| | | |
|---|---|---|
| 2,308,404 | Thornhill | Jan. 12, 1943 |
| 2,620,182 | Marston | Dec. 2, 1952 |
| 2,781,869 | Boehm et al. | Feb. 19, 1957 |
| 2,802,664 | Jackson | Aug. 13, 1957 |
| 2,915,307 | Heiss | Dec. 1, 1959 |